P. M. TAYLOR.
TRANSMISSION MECHANISM.
APPLICATION FILED MAY 25, 1916.

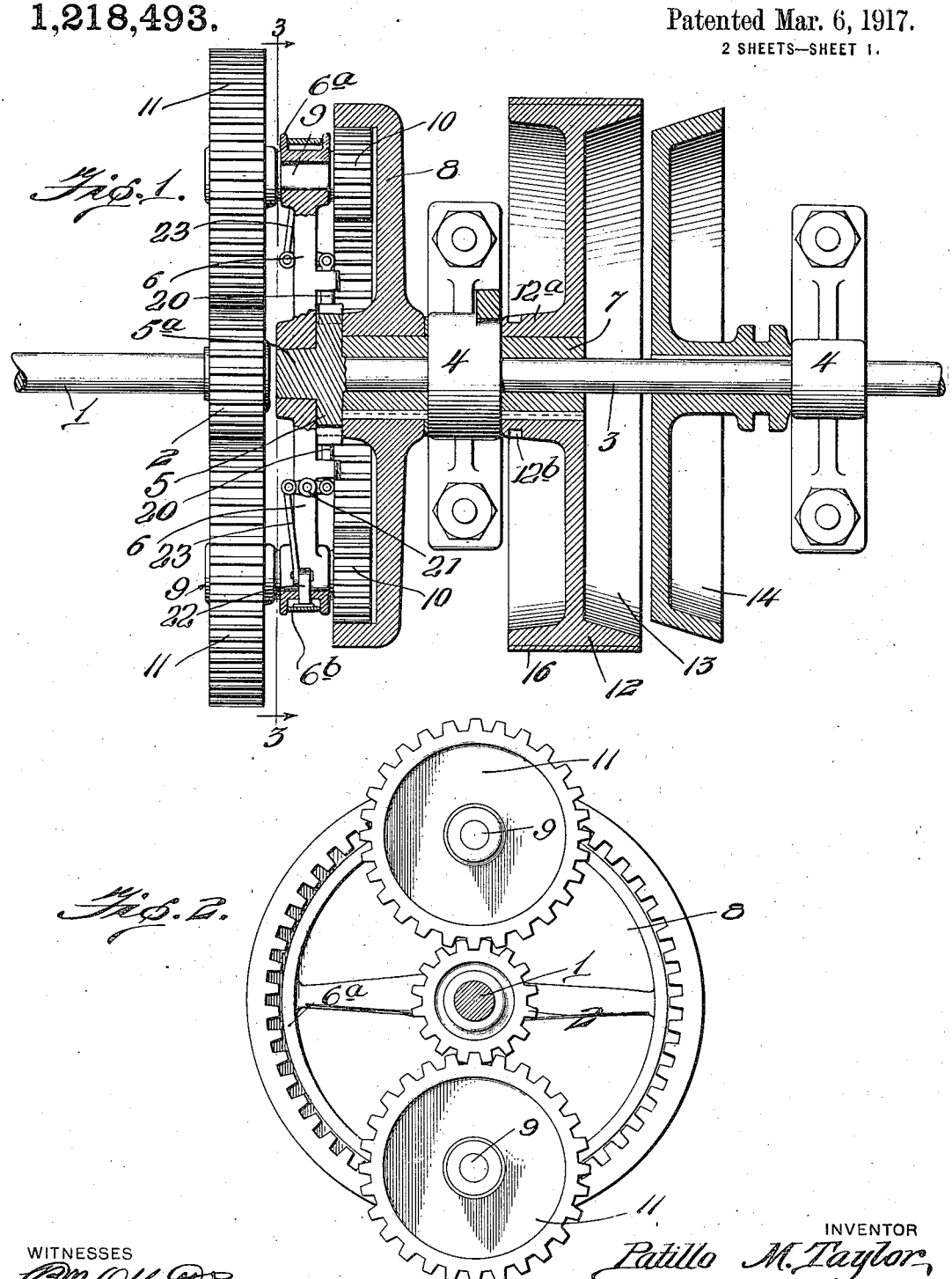

1,218,493.

Patented Mar. 6, 1917.
2 SHEETS—SHEET 2.

WITNESSES

INVENTOR
Patillo M. Taylor,
BY
ATTORNEY

UNITED STATES PATENT OFFICE.

PATILLO M. TAYLOR, OF EASLEY, SOUTH CAROLINA.

TRANSMISSION MECHANISM.

1,218,493.   Specification of Letters Patent.   Patented Mar. 6, 1917.

Application filed May 25, 1916. Serial No. 99,869.

*To all whom it may concern:*

Be it known that I, PATILLO M. TAYLOR, a citizen of the United States, residing at Easley, in the county of Pickens and State of South Carolina, have invented certain new and useful Improvements in Transmission Mechanisms, of which the following is a specification.

This invention has relation to transmission mechanism, and the nature and objects thereof will be readily apparent to those skilled in the art to which it appertains, in the light of the following explanation of the accompanying drawings, illustrating what I now believe to be the preferred embodiment, or mechanical expression, of my invention from among other forms and arrangements within the spirit thereof and the scope of the appended claims.

However, an object of the invention is to provide a transmission mechanism adapted to be interposed between a machine which is to be driven and a prime mover of the internal combustion type for the purpose of imparting an initial rotative movement of the machine at a low speed so as to preclude stoppage of the prime mover due to the sudden application of resistance which would otherwise occur, were it not for the provision of this invention, and with means for permitting direct drive of the machine after the moving parts thereof have acquired sufficient momentum and the possibility of "choking" the prime mover no longer exists.

Another object of the invention is to provide a transmission mechanism of the character described wherein a reversal of the device may be had without actually reversing the direction of rotation of the engine crank shaft.

In addition to the foregoing my invention comprehends improvements in the details of construction and arrangement of parts to be hereinafter described and particularly pointed out in the appended claims.

In the accompanying drawings in which similar and corresponding parts are designated by the same characters of reference throughout the several views in which they appear:—

Figure 1, is a vertical section taken through a transmission mechanism constructed after the manner of my invention.

Fig. 2, is an end elevation thereof looking toward the left-hand side of Fig. 1.

Figure 3:
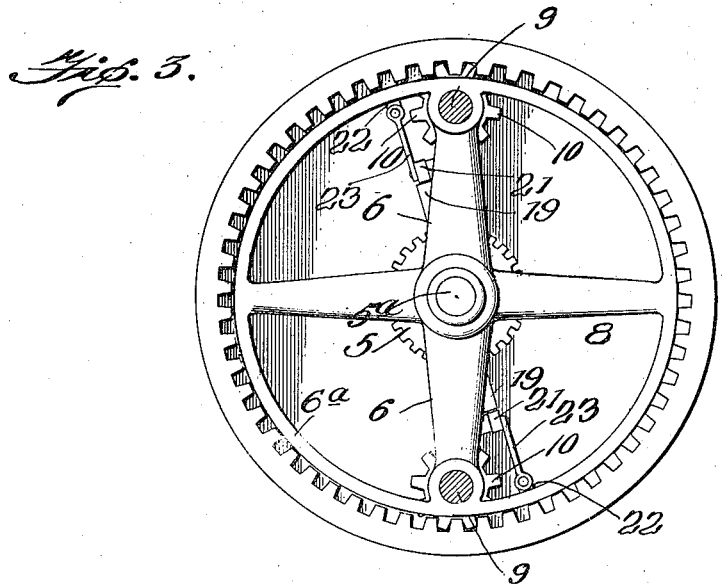
Fig. 3, is a vertical transverse section taken on the line 3—3 of Fig. 1.
Figure 4:
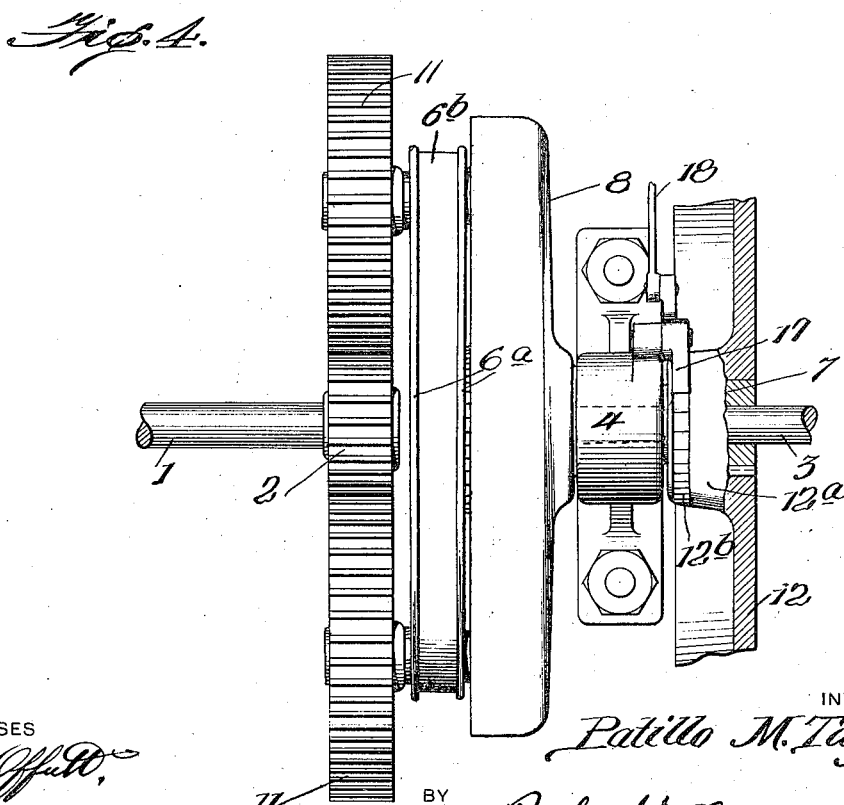
Fig. 4, is a view in elevation of the left-hand end of Fig. 1.

Where an internal combustion engine is used as the prime mover of machinery, the act of suddenly connecting the machine to the prime mover for transmitting power thereto often results in the simultaneous stoppage of the engine, due to what is technically termed "choking"; a defect present in engines of this type, and especially those including but few cylinders. It is therefore the purpose of my invention to permit a gradual application of power from the engine to the machine so as to prevent the possibility of "choking", and to subsequently permit direct drive of the machine after the moving parts thereof have acquired sufficient momentum.

I further propose to accomplish this without the necessity of shifting gears, and to permit the changing from low speed to direct drive so as to produce no appreciable effect upon the prime mover due to such change of transmission.

I have illustrated in the accompanying drawings the essentials of my invention without illustrating their connection with either a machine or a prime mover, omitting all unnecessary details. In the drawings 1 indicates a drive shaft having secured at one end a pinion 2; a driven shaft 3 is mounted in bearings 4 in axial alinement with the drive shaft 1, and has secured to one end a ratchet 5 and an extension 5ª for the support of a band wheel formed of radial arms 6 and a flanged rim 6ª. A brake band 6ᵇ seated within the rim is adapted to be contracted around the rim by mechanism not shown.

A sleeve 7 embraces the driven shaft 3 adjacent the end of which is secured the arm 6, the sleeve 7 being mounted for rotation within the bearing 4. An internal gear 8 is keyed to the sleeve 7, adjacent the drive pinion 2, and said sleeve may be termed an intermediate shaft. The outer ends of the arms 6 are apertured to form bearings for shafts 9 having mounted at their ends pinions 10 for meshing engagement with the inner gear, and pinions 11 at their other ends for meshing engagement with the pinion 2 of the drive shaft 1.

The end of the sleeve 7 opposite the internal gear is provided with a pulley 12 having a concave clutch face 13, said pulley being keyed to the sleeve for rotation therewith as well as the internal gear 8. A convex clutch element 14 is splined upon the driven shaft for locking engagement with the pulley 12 by a suitable lever (not shown).

The hub 12$^a$ of the pulley 12 is formed with a circumferential series of ratchet teeth 12$^b$ for engagement by a pivoted pawl 17 whereby rotation of said pulley is limited to one direction only, under normal conditions. The pawl may be disengaged by means of a rod 18 connected thereto.

Lugs 19 are formed on the inner sides of the arms 6 for the support of radial pawls 20 which are pivoted to levers 21 fulcrumed to the arms. Radially movable band engaging pins 22 are mounted in the rim 6$^a$ at diametrically opposite points, and are connected by means of links 23 to the other rods of the levers 21. It is evident that upon engagement of the pins by the band 6$^b$, the pawls 20 will be correspondingly disengaged from the ratchet 5.

In operation, and assuming the drive shaft to be in direct connection with the crank shaft of an internal combustion engine, and the driven shaft to be in connection with the power shaft of a machine, a band 16 is compassed around the pulley 12 and this band is contracted around the said pulley by means not shown, whereby the pulley 12 is held against rotation. Assuming that the pulley 12 is held stationary the rotation of the drive shaft 1 results in an orbital movement of the gears 10 and 11 around the axis of the drive and driven shafts, and owing to the fact that the arms are also rotated, the driven shaft has imparted to it a rotative movement in the same direction as the drive shaft and at a speed reduced therefrom depending upon the ratio of the gears 2, 8, 10, and 11.

When the moving parts of the machine have acquired the momentum sufficient to warrant the application of a direct drive, the breaking mechanism is released so as to permit the rotation of the pulley 12 and the clutch element 14 moved into locking engagement with said pulley whereupon relative rotation of the internal gear and the arms 6 is precluded, and the planetary gearing rotated as a whole, receiving a rotative speed corresponding to the rotative speed of the drive shaft thereby constituting the direct drive. The pawl and ratchet mechanism 12$^b$ and 17 prevents a backward movement of the pulley 12 at the time the band 16 is disengaged therefrom.

When a reversal of the driven machine is desired, the band 6$^b$ is gradually contracted around the rim 6$^a$ and the driven shaft 3 is disengaged from the band wheel in the manner previously described. The band wheel now being held stationary it will be obvious that the gears 10 and 11 form in effect idler pinions for the purpose of reversing the rotation from the drive shaft to the intermediate, or sleeve shaft 7, the clutch members 13 and 14 must of course be in locking engagement so that the driven shaft 3 may receive motion from the sleeve 7, and permit rotation of said sleeve and the shaft in unison.

A reduction of the speed imparted to the machine may be accomplished at any time by disengaging the clutch element 14 from the pulley 12 which will stop rotation and may be held by the band brake or the ratchet lock (as it will only incline to run in a reverse direction to the drive shaft) whereupon relative motion of the planetary gears again takes place in the manner previously described.

Various ways of constructing my invention will occur to those skilled in the mechanical arts for the purpose of employing the principles presented therein, and I therefore reserve the right and privilege of changing the form of the details of construction, or otherwise altering the arrangement of the correlated parts without departing from the spirit of the invention and the scope of the appended claims.

Having thus described my invention what I claim as new and desire to secure by Letters Patent is:—

1. In a transmission mechanism, a drive shaft, a driven shaft, and an intermediate shaft, a gear on said drive shaft, means for locking the intermediate shaft against rotation, supporting means on the driven shaft, clutch mechanism mounted on said supporting means operable to clutch said supporting means to said driven shaft, motion transmitting means on said supporting means in engagement with the said gear, means operatively associated with said last mentioned means, mounted on the intermediate shaft, for transmitting motion from the drive shaft to the driven shaft, at a reduced ratio when said intermediate shaft is locked, and means for locking the intermediate and driven shafts together for rotation in unison, whereby, the transmitting means may be caused to rotate said intermediate and driven shafts at the speed of and by the drive shaft.

2. In a transmission mechanism a drive shaft, a driven shaft, and an intermediate shaft, means for locking the intermediate shaft against rotation, orbitally and rotatably movable gears, means on the driven shaft for supporting said gears, a gear on said intermediate shaft for transmitting motion from the drive shaft to the driven shaft at a reduced ratio when said intermediate shaft is locked, means for locking the intermediate and driven shafts together for simultaneous rotation and to permit orbital movement only of the gears whereby the intermediate and driven shafts are rotated at the speed of, and by the drive shaft.

3. In a transmission mechanism a drive shaft, a driven shaft, and an intermediate shaft, means for locking the intermediate shaft against rotation, orbitally and rotatably movable gears, means on the driven shaft for supporting said gears, a gear on said intermediate shaft for transmitting motion from the drive shaft to the driven shaft at a reduced ratio when said intermediate shaft is locked, means for locking the intermediate and driven shafts together for simultaneous rotation and to permit orbital movement only of the gears whereby the intermediate and driven shafts are rotated at the speed of, and by the drive shaft, and means for locking the gears against orbital movement to permit rotative movement thereof only, for imparting reverse movement to the intermediate and driven shafts subsequent to disengagement of the driven shaft from the gears.

4. In a transmission mechanism a drive shaft, a gear on the shaft, a driven shaft, an intermediate shaft, a gear on the intermediate shaft, an arm on the driven shaft, gears on the arm for meshing engagement with the drive shaft gear and a second set of gears on said arm for engagement with the intermediate shaft gear and being for transmitting motion from the drive shaft to the driven shaft at a reduced speed when said intermediate shaft is locked against rotation, means for locking said intermediate shaft against rotation, and means for locking the intermediate and driven shafts together for simultaneous rotation whereby the intermediate and driven shafts may be rotated at the speed of, and by the drive shaft.

5. In a transmission mechanism a drive shaft, a gear on said shaft, a driven shaft, an arm on said driven shaft, two sets of gears of different dimensions journaled for rotation on the arm, one set of said gears meshing with the drive shaft gear, an intermediate shaft, a gear on said intermediate shaft for meshing engagement with the other set of gears of the arm, means for holding the intermediate shaft against rotation to permit transmission of motion from the drive shaft to the driven shaft at a reduced ratio, and means for locking the intermediate and driven shafts together for simultaneous rotation whereby, relative rotation of the gears is precluded and direct drive of the driven shaft by the drive shaft permitted.

6. In a transmission mechanism a drive shaft, a driven shaft in axial alinement with said drive shaft, an intermediate sleeve shaft mounted upon the driven shaft, a gear on the drive shaft, an internal gear on the sleeve shaft, an arm on the driven shaft, two sets of gears of different dimensions one set meshing with the drive shaft and the other set meshing with the sleeve shaft gears, means for holding the sleeve shaft against rotation to permit transmission of motion from the drive to the driven shaft at a reduced ratio, and means for locking together the sleeve and driven shafts to permit direct drive of the driven shaft by the drive shaft.

7. In a transmission mechanism a drive shaft, a driven shaft in axial alinement with said drive shaft, an intermediate sleeve shaft mounted upon the driven shaft, a gear on the drive shaft, an internal gear on the sleeve shaft, radial arms mounted upon the driven shaft for rotation therewith, shafts journaled in the ends of the arms, a set of gears mounted on said shafts for engagement with the internal gear, a second set of gears on said arm shafts for engagement with the drive shaft gear, means for holding the sleeve shaft against rotation to permit transmission of motion from the drive to the driven shaft at a reduced ratio, and means for locking together the sleeve and driven shafts to permit direct drive of the driven shaft by the drive shaft.

8. In a transmission mechanism a drive shaft, a driven shaft in axial alinement with said drive shaft, an intermediate sleeve shaft mounted upon the driven shaft, a gear on the drive shaft, an internal gear on the sleeve shaft, an arm radially disposed and mounted for rotation upon the driven shaft, two sets of gears of different dimensions journaled on said arm, one set of gears meshing with the drive shaft gear the second set meshing with the internal gear, means for holding the sleeve shaft and internal gear against rotation to permit orbital movement of the arm and gears to transmit motion from the drive to the driven shaft at a reduced ratio, means for locking together the sleeve and driven shafts to permit direct drive of the driven shaft by the drive shaft, and means for holding the arm and its gears against orbital movement to per mit transmission of motion in a reverse direction from the drive to the driven shaft subsequent to disengagement of the driven shaft from the arm.

9. In a transmission mechanism a drive shaft, a driven shaft in axial alinement with said drive shaft, an intermediate sleeve shaft mounted for rotation upon the driven shaft, a pulley having a clutch face mounted upon the sleeve for rotation therewith, planetary gears for transmitting motion from the drive to the driven shaft when the pulley is held against rotation, and a clutch member keyed to the driven shaft for locking engagement with the pulley to render the planetary gears inoperative and permit direct drive of the driven shaft by the drive shaft.

10. In a transmission mechanism a drive shaft, a driven shaft in axial alinement with said drive shaft and having a ratchet wheel rotatable therewith, an intermediate sleeve shaft mounted on the driven shaft, a gear on the drive shaft, an internal gear on the sleeve shaft, a band wheel rotatably mounted upon the driven shaft, a contractible band around said wheel, pawls mounted on the wheel and engaging the ratchet wheel to permit simultaneous rotation of the band wheel and driven shaft, means operable upon contraction of the band to withdraw the pawls from such engagement, shafts journaled in the band wheel, a set of gears on said shafts meshing with the drive gear and a second set of gears on said shaft meshing with said internal gear, a clutch pulley rotatable with the sleeve shaft, and having a ratchet surface formed thereon, a pivoted pawl stationarily mounted and engaging said ratchet surface to permit rotation of the pulley in one direction only, and a mating clutch member rotatable with the driven shaft and engageable with the clutch pulley.

In testimony whereof I affix my signature in presence of two witnesses.

PATILLO M. TAYLOR.

Witnesses:
E. V. BABB,
J. L. BOLT.